(12) United States Patent
Atarashi et al.

(10) Patent No.: US 6,512,771 B1
(45) Date of Patent: Jan. 28, 2003

(54) TRANSMISSION BANDWIDTH SHARING SYSTEM

(75) Inventors: Toshikatsu Atarashi, Kawasaki (JP);
Takeshi Kimura, Kawasaki (JP);
Naokazu Kawamura, Kawasaki (JP);
Eitarou Hiraga, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/195,090

(22) Filed: Nov. 18, 1998

(30) Foreign Application Priority Data

Mar. 13, 1998 (JP) .......................................... 10-062722

(51) Int. Cl.$^7$ .......................... H04L 1/00; H04L 12/26; H04L 12/28; H04L 12/56; H04J 1/16; H04J 3/14; G01R 31/08; G06F 11/00; G08C 15/00

(52) U.S. Cl. ................................. 370/395.4; 370/395.2; 370/230

(58) Field of Search ................................. 370/229–234, 370/395, 465, 468, 230.1, 395.1, 442, 443, 449, 458, 431, 395.4, 395.41, 395.42, 395.43, 395.2, 395.21

(56) References Cited

U.S. PATENT DOCUMENTS

| | | | | |
|---|---|---|---|---|
| 5,132,966 A | * | 7/1992 | Hayano et al. | 370/233 |
| 5,570,355 A | * | 10/1996 | Dail et al. | 370/352 |
| 5,737,312 A | * | 4/1998 | Sasagawa | 370/232 |
| 5,862,126 A | * | 1/1999 | Shah et al. | 370/230 |
| 5,894,471 A | * | 4/1999 | Miyagi et al. | 370/230 |
| 5,920,544 A | * | 7/1999 | Watanabe | 370/232 |
| 6,198,723 B1 | * | 3/2001 | Parruck et al. | 370/230.1 |

FOREIGN PATENT DOCUMENTS

| | | |
|---|---|---|
| JP | 3-235448 | 10/1991 |
| JP | 4-207733 | 7/1992 |
| JP | 5-83284 | 4/1993 |
| JP | 8-331149 | 12/1996 |

* cited by examiner

Primary Examiner—Kwang Bin Yao
Assistant Examiner—Kevin C. Harper
(74) Attorney, Agent, or Firm—Katten Muchin Zavis Rosenman

(57) ABSTRACT

The present invention concerns a transmission bandwidth sharing system and provides, in particular, a transmission bandwidth sharing apparatus used in an ATM exchange for sharing one CBR bandwidth on an ATM line among a plurality of ATM terminals in a multimedia network or the like. The CBR bandwidth sharing apparatus comprises a bandwidth management table for registering bandwidth and information relating to the bandwidth for each identified CBR bandwidth, a bandwidth sharing management table for registering, for each identified CBR bandwidth, one or more terminals that use the bandwidth for CBR communication and information relating to the one or more terminals, and a signal transmission timing management table for registering valid signal transmission timings of the registered terminals for each identified CBR bandwidth. Based on the bandwidth information and terminal information, the CBR bandwidth sharing apparatus allocates a timing in an invalid signal transmission period of one of the registered terminals for use as a transmission timing of a valid signal from another one of the registered terminals, thereby enabling a plurality of CBR communication connections to be established by sharing the identified one CBR bandwidth.

11 Claims, 21 Drawing Sheets

Fig.8

<PEAK CELL RATE>

```
DTEa1    20Mbps
DTEa2    10Mbps
```

| ID | COMMON PEAK CELL RATE | TOTAL NUMBER OF CELLS (CELLS/SEC) |
|---|---|---|
|  |  |  |

⬇ REGISTER

| ID | COMMON PEAK CELL RATE | TOTAL NUMBER OF CELLS (CELLS/SEC) |
|---|---|---|
| 01 | 20Mbps | 100 |

| BANDWIDTH IDENTIFYING ID: 01 | | | | |
|---|---|---|---|---|
| NUMBER OF CELLS (CELLS/SEC) | SLOTS | | | |
| | DTE | TRANSMISSION TIMING | DTE | TRANSMISSION TIMING |
| | | | | |

⟹ REGISTER

| BANDWIDTH IDENTIFYING ID: 01 | | | | |
|---|---|---|---|---|
| NUMBER OF CELLS (CELLS/SEC) | SLOTS | | | |
| | DTE | TRANSMISSION TIMING | DTE | TRANSMISSION TIMING |
| 100 | DTEa1 | 01 ~ 40 | DTEa2 | 41 ~ 60 |

19

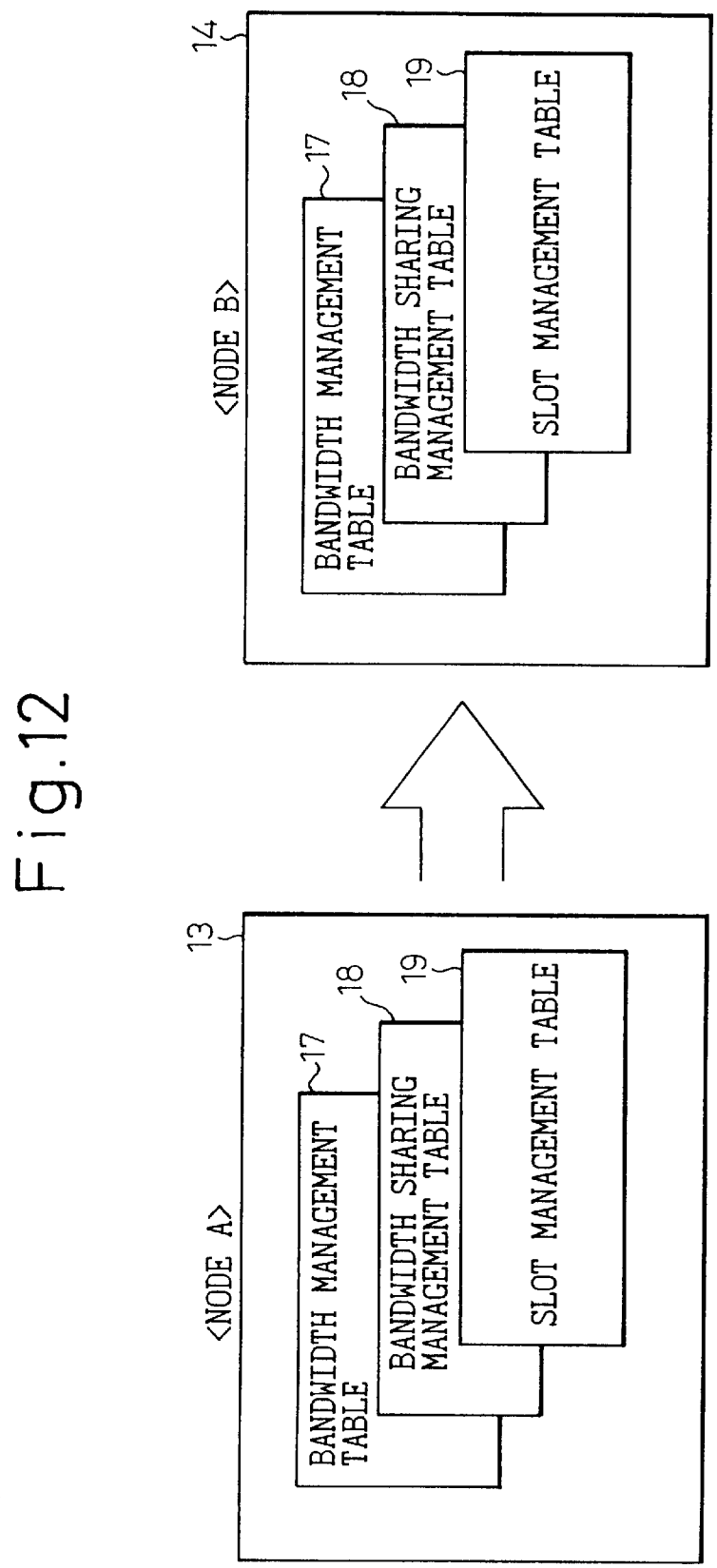

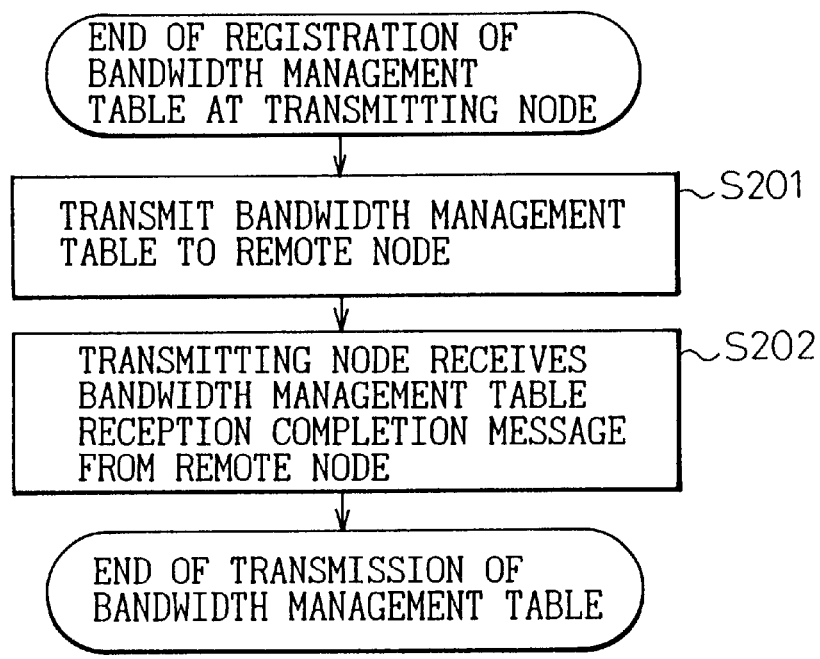
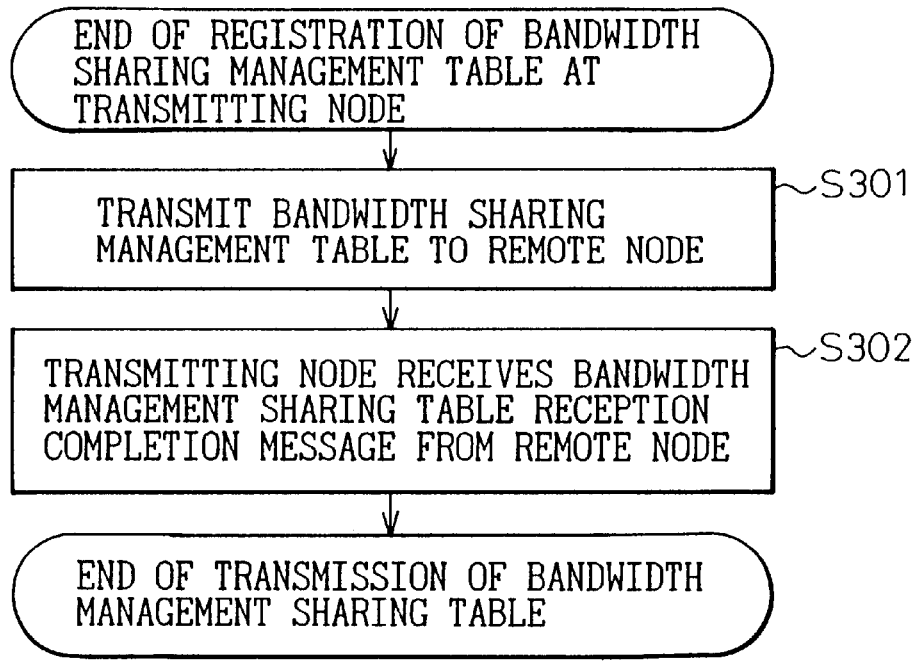

Fig.15

BANDWIDTH IDENTIFYING ID: 01 (NODE A) ~18

| SOURCE INFORMATION | | | DESTINATION INFORMATION | | | PEAK CELL RATE | NUMBER OF VALID CELLS |
|---|---|---|---|---|---|---|---|
| DTE | VPI | VCI | DTE | VPI | VCI | | |
| DTEa1 | 101 | 111 | DTEb1 | 201 | 211 | 20 | 40 |
| DTEa2 | 102 | 112 | DTEb2 | 202 | 212 | 10 | 20 |

⇨ TRANSMIT

BANDWIDTH IDENTIFYING ID: 01 (NODE B) ~18

| SOURCE INFORMATION | | | DESTINATION INFORMATION | | | PEAK CELL RATE | NUMBER OF VALID CELLS |
|---|---|---|---|---|---|---|---|
| DTE | VPI | VCI | DTE | VPI | VCI | | |
| DTEb1 | 201 | 211 | DTEa1 | 101 | 111 | 20 | 40 |
| DTEb2 | 202 | 212 | DTEa2 | 102 | 112 | 10 | 20 |

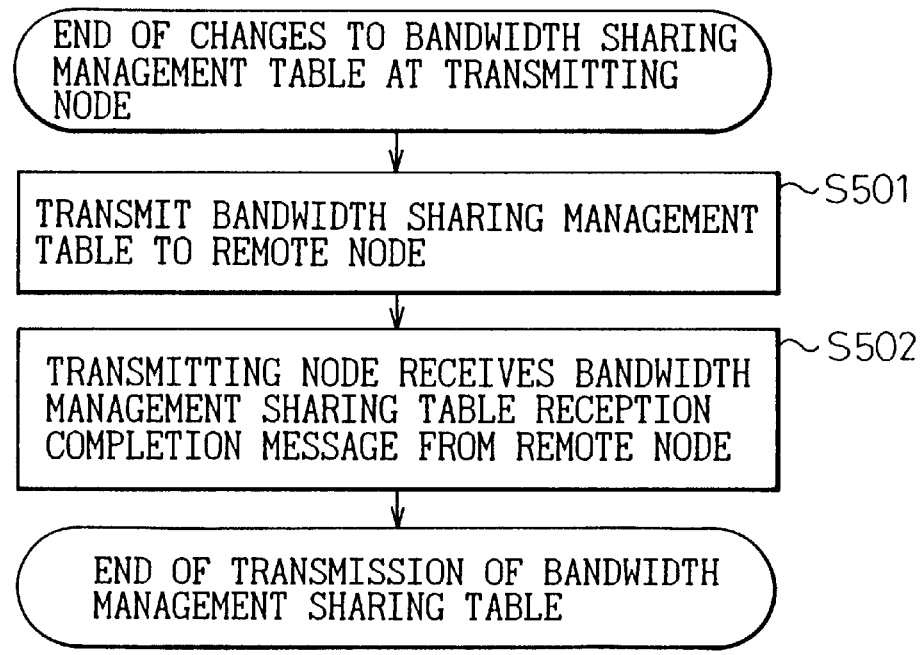
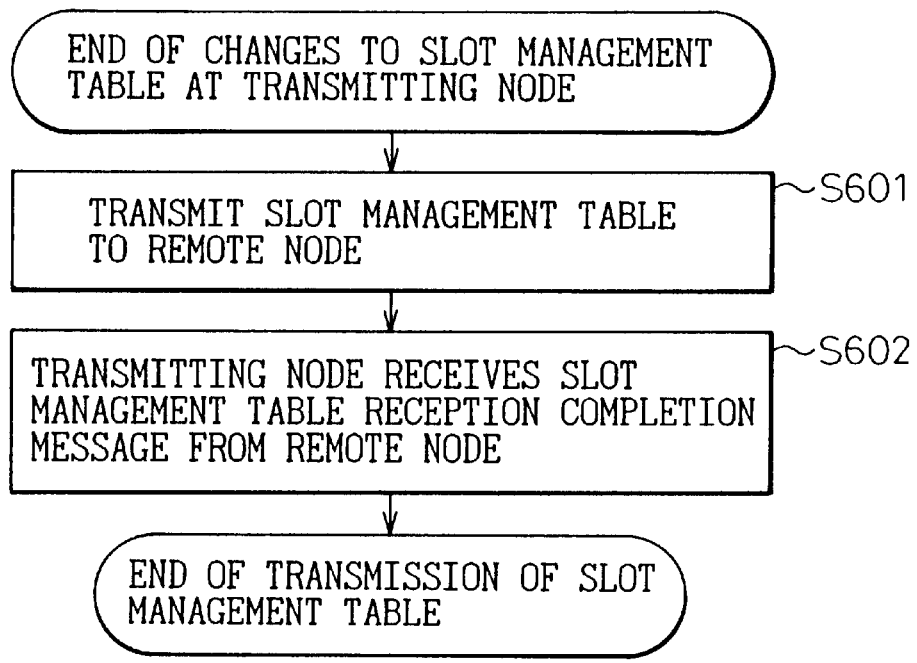

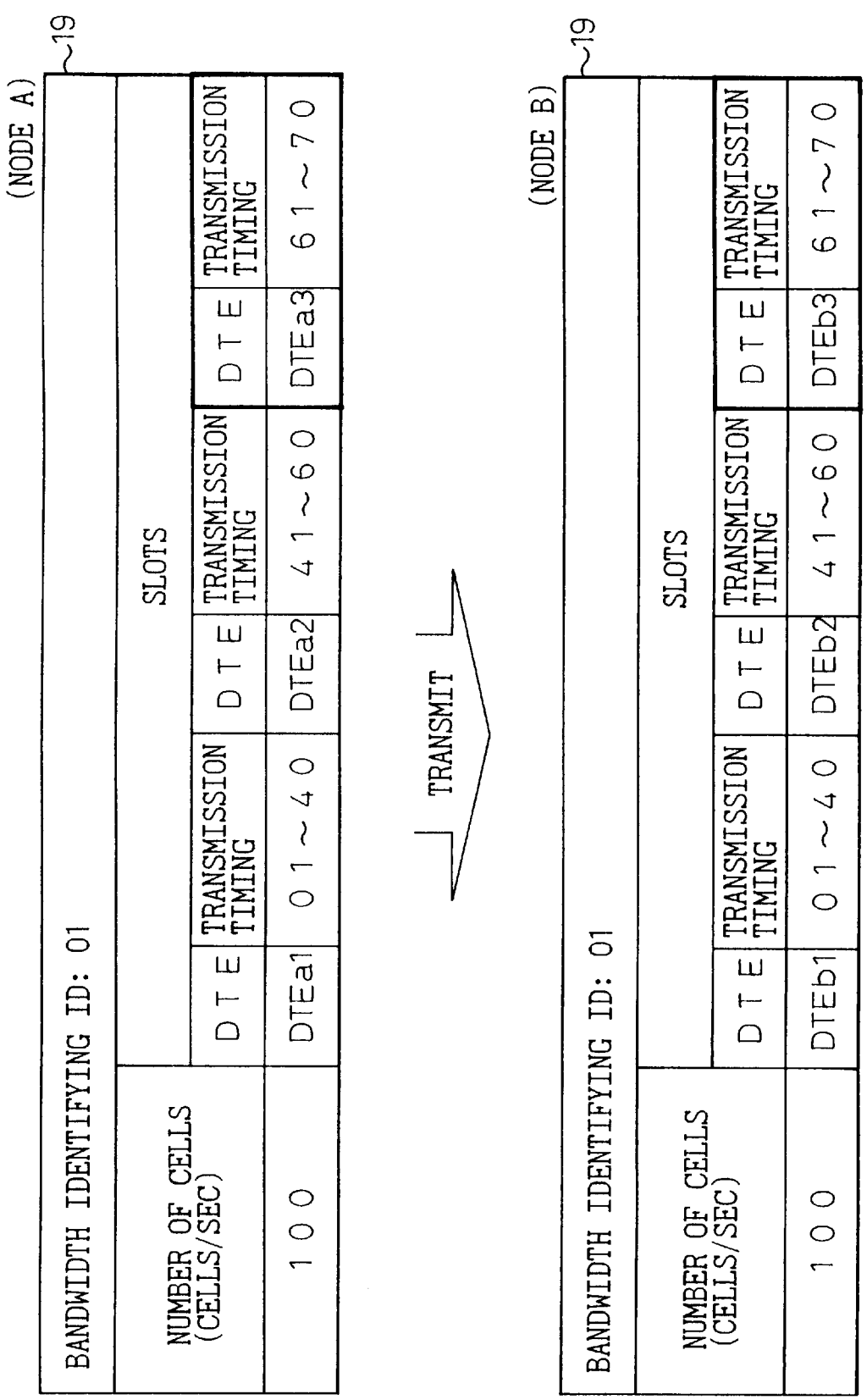

TRANSMISSION BANDWIDTH SHARING SYSTEM

BACKGROUND OF THE INVENTION

1. Field of the Invention

The present invention relates to a transmission bandwidth sharing system, e.g., CBR communication system, etc., and more particularly to a transmission bandwidth sharing apparatus used in an ATM exchange for sharing one CBR (Constant Bit Rate) bandwidth on an ATM (Asynchronous Transfer Mode) line among a plurality of ATM terminals in a multimedia network or the like, and a method for the same.

2. Description of the Related Art

FIG. 1 is a diagram for explaining an ATM cell transmission in CBR communication.

When a CBR bandwidth is set up in an ATM exchange, valid cells (shaded cells in FIG. 1) are sent out from the ATM exchange onto an ATM line at a constant interval a, as shown in FIG. 1. The required CBR transmission bandwidth (CBR setup bandwidth=n Mbps) is determined based on the cell interval a in the peak traffic that uses the bandwidth.

In recent multimedia communication systems, compression techniques are often used to increase the transmission efficiency of voice, video, and other information. In the case of an ATM terminal using a compression technique, input data is first compressed and then assembled into cells for transmission over an ATM network.

FIG. 2 shows a schematic representation of a process in which video information is compressed and assembled into ATM cells by an ATM terminal for transmission over an ATM network.

In FIG. 2, a video signal 2, for example, a 6-MHz analog television signal, from a video terminal 1 is input to an ATM terminal 3. A compression mechanism 4 in the ATM terminal 3 converts the input signal into a compressed signal 5, such as an MPEG-2 compressed signal, and an ATM conversion mechanism 6 converts the compressed signal 5 into ATM cells 8 for transmission onto an ATM line 7.

Since the compression mechanism 4 compresses the video signal 2 utilizing the regularity of the video data, it requires buffering the data for a certain period of time. The compressed data is then assembled into a frame of fixed length and transferred to the ATM conversion mechanism 6. Accordingly, the compressed signal 5 is output in a bursty manner at fixed intervals of time, as shown in FIG. 2. Further, since the ATM conversion mechanism 6 converts the thus received frame signal (compressed signal 5) into cells, the interval at which the ATM cells 8 are sent out on the ATM line 7 is not constant, though it has certain regularity.

As previously stated, when a CBR bandwidth is set up in an ATM exchange, valid cells are output from the ATM exchange onto the ATM line at constant intervals of time. On the other hand, when information compression is performed at the ATM terminal, since data is buffered for a certain period of time before applying the compression, the interval between the valid cells sent out on an ATM network loses regularity in terms of the interval between adjacent cells, though there is a periodicity defined by the buffering time.

Generally, for transmission of video information, it is desirable to use CBR as a service category in view of its real time requirement, cell loss prevention, etc. When an ATM terminal using a compression technique is accommodated in an ATM exchange providing CBR transmission between stations, the bandwidth to be assigned to the CBR transmission is determined based on the peak cell rate (the cell rate in a time segment where the cell interval is short) of non-constant signals from the ATM terminal.

FIG. 3 shows the compression process of FIG. 2 in comparison with the CBR line of FIG. 1.

In FIG. 3, the valid cells (shaded cells in FIG. 3) output from the ATM terminal 3 are subjected to compression at the ATM terminal 3 at a cycle d. In the illustrated example, the compression cycle d is twice the valid-cell cycle a in FIG. 1 (d=a×2). On the other hand, the shorter valid-cell cycle b is ⅓ of the valid-cell cycle a in FIG. 1 (b=⅓a).

In this case, therefore, the required CBR setup bandwidth is three times the bandwidth in FIG. 3 (CBR setup bandwidth=3n Mbps), but the number of valid cells actually transmitted within one compression cycle in FIGS. 3 is 2, which is equal to the number of valid cells transmitted within the same length of time in FIG. 1, i.e., within two valid-cell cycles (a×2). As a result, in the illustrated example, two thirds of the CBR setup bandwidth are occupied by invalid cells (blank cells in FIG. 3), as shown in the right-hand side of FIG. 3.

In this way, the prior art has had various problems affecting transmission efficiency of CBR; for example, 1) invalid cells are sent out on the CBR channel between ATM exchanges during the period that compression is performed at the ATM terminal side, and 2) as a result, a CBR bandwidth greater than the necessary throughput has to be reserved, which limits other traffic on the network.

SUMMARY OF THE INVENTION

In view of the above problems, it is an object of the present invention to achieve efficient utilization of a CBR bandwidth by preregistering valid-cell transmission timings and invalid-cell transmission timings when setting up the CBR bandwidth at an ATM exchange, and by allowing the same CBR bandwidth to be shared by a plurality of terminals based on combinations of the timings so that valid cells can be transmitted at timings where invalid cells would otherwise be transmitted.

It is also an object of the present invention to achieve efficient utilization of the CBR bandwidth when an additional terminal is connected to the ATM exchange, by additionally setting in the existing CBR bandwidth the valid-cell transmission timings and invalid-cell transmission timings for the additional terminal.

According to the present invention, there is provided a transmission bandwidth sharing apparatus accommodating a plurality of terminals and having means for allocating, based on bandwidth information of one transmission channel bandwidth being constant and terminal information relating to each of the plurality of terminals, a timing in an invalid signal transmission period of one of the terminals for use as a transmission timing of a valid signal from another one of the terminals, thereby allowing the one constant bandwidth of a transmission channel to be shared among the plurality of terminals.

The transmission bandwidth sharing apparatus comprises: a bandwidth management table for registering a bandwidth and information relating to the bandwidth for each identified transmission channel bandwidth; a bandwidth sharing management table for registering, for each identified bandwidth, one or more terminals that use the bandwidth and information relating to the one or more terminals; a signal transmission timing management table for registering valid signal transmission timings of the registered terminals for each identified bandwidth; and transmission sharing means for allocating, based on the bandwidth information and terminal information, a timing in an invalid signal transmission period of one of the registered terminals for use as a transmission timing of a valid signal from another one of the registered terminals, thereby enabling a plurality of communication connections to be established by sharing the identified one transmission channel bandwidth.

The transmission bandwidth sharing apparatus further comprises transmission means for transmitting all or part of the management tables to another transmission bandwidth sharing apparatus at a remote end of the communication, and the transmission sharing means sets up only one communication connection within one transmission channel bandwidth when the sharing of the transmission channel bandwidth is not specified.

The transmission bandwidth sharing apparatus and the terminals are ATM devices, and the bandwidth information includes bandwidth identifying information, a peak cell rate to be shared by the terminals, and the total number of valid and invalid cells contained therein, while the terminal information includes the peak cell rate of each of the terminals and the number of valid cells contained therein.

The transmission sharing means allocates timings in invalid cell signal transmission periods to terminals when the sum of the peak cell rates of the terminals is within the peak cell rate to be shared by the terminals and when the sum of the valid cells of the terminals is within the total number of cells contained in the peak cell rate to be shared by the terminals.

According to the present invention, there is also provided a transmission bandwidth sharing method, comprising: registering a bandwidth for each identified transmission channel bandwidth being constant; registering, for each identified bandwidth, one or more terminals that use the bandwidth; allocating, for each identified bandwidth, a timing in an invalid signal transmission period of one of the registered terminals for use as a transmission timing of a valid signal from another one of the registered terminals; and allowing said other one of the registered terminals to transmit a valid signal at the valid signal transmission timing allocated thereto, whereby a plurality of communication connections are established within the identified one transmission channel bandwidth.

The method further includes transmitting all or part of registration information obtained by the registration to another apparatus at a remote end of the communication in order to share transmission channel information, and making said other apparatus change the transmission channel information upon receipt to information that matches said other apparatus. The method also includes setting up only one communication connection within one transmission channel bandwidth when the sharing of the transmission channel bandwidth is not specified.

BRIEF DESCRIPTION OF THE DRAWINGS

The present invention will be more clearly understood from the description as set forth below with reference to the accompanying drawings.

FIG. 8 is a diagram showing a registration example of a bandwidth management table.

FIG. 10 is a diagram showing a registration example of a slot management table.

FIG. 12 is a diagram for explaining the transmission of the registered management tables to another node.

FIGS. 13A to 13C are diagrams showing examples of transmission process flows for the registered management tables.

FIG. 15 is a diagram showing an example of transmission of the bandwidth sharing management table.

FIGS. 17A to 17B are diagrams showing examples of transmission process flow for the management tables when changes are made.

FIG. 19 is a diagram showing an example of changes made to the slot management table.

DESCRIPTION OF THE PREFERRED EMBODIMENTS

Figure 1:
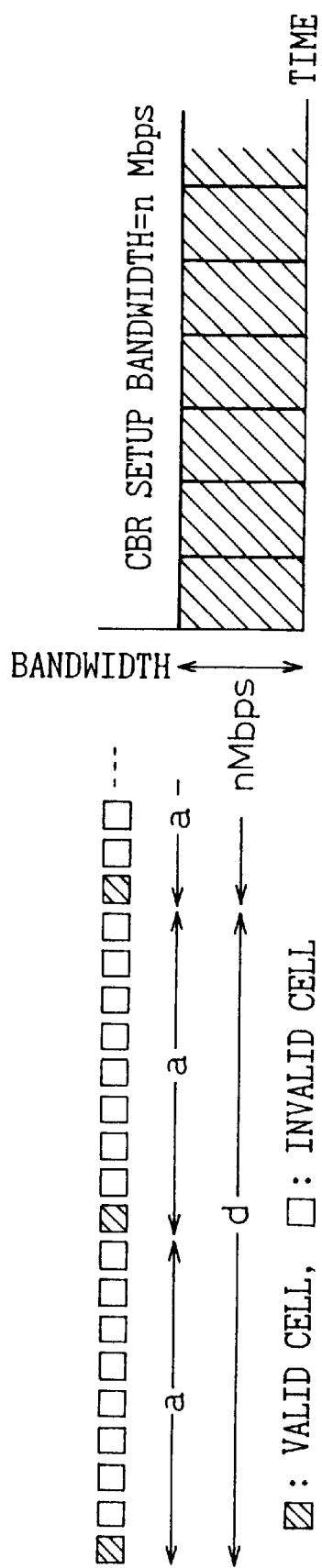
FIG. 1 is a diagram for explaining an ATM cell transmission in CBR communication.
Figure 2:
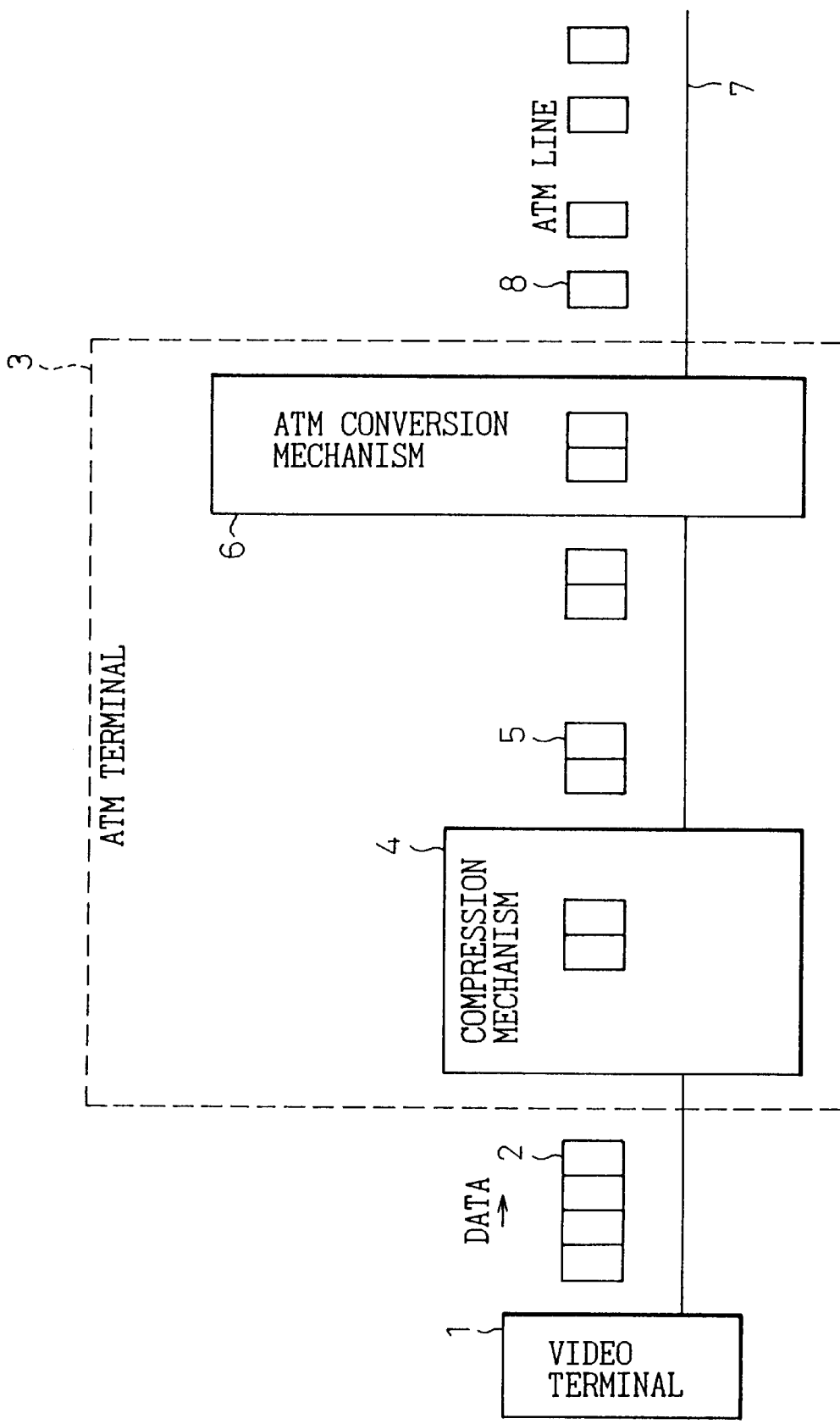
FIG. 2 is a diagram showing one example of a compression process at an ATM terminal.
Figure 3:
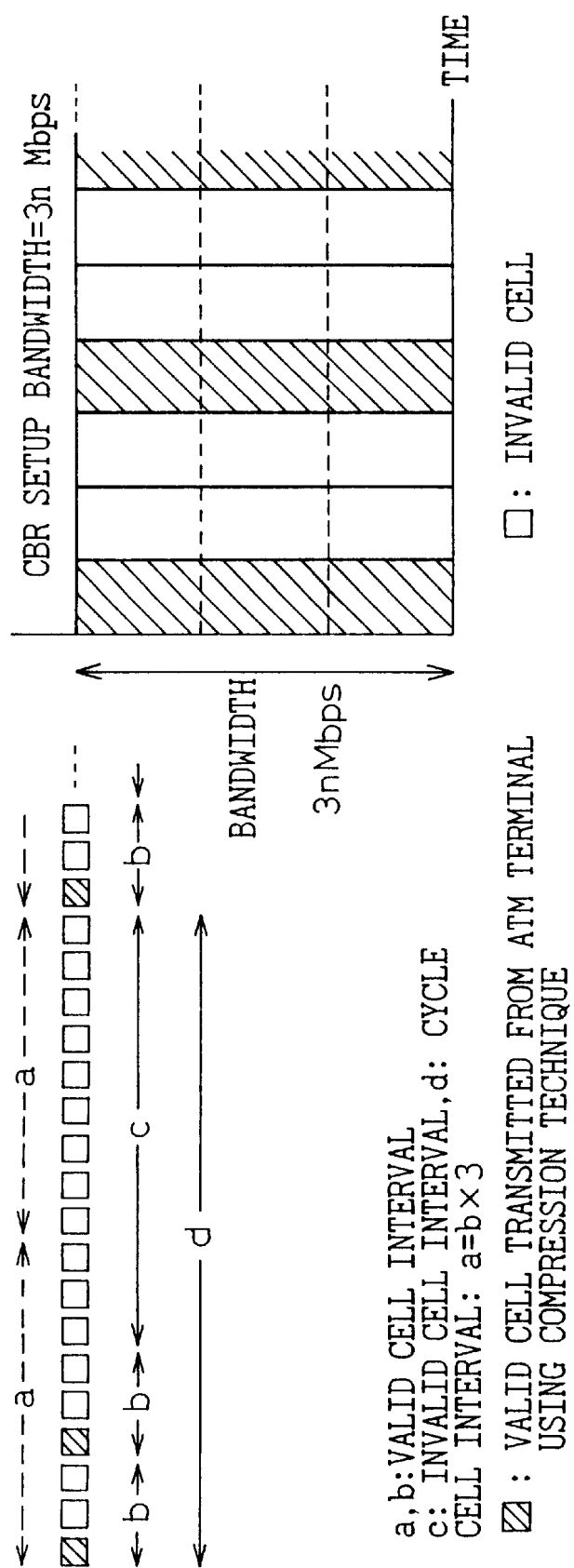
FIG. 3 is a diagram showing the relationship between the compression process of FIG. 2 and the CBR communication.
Figure 4:
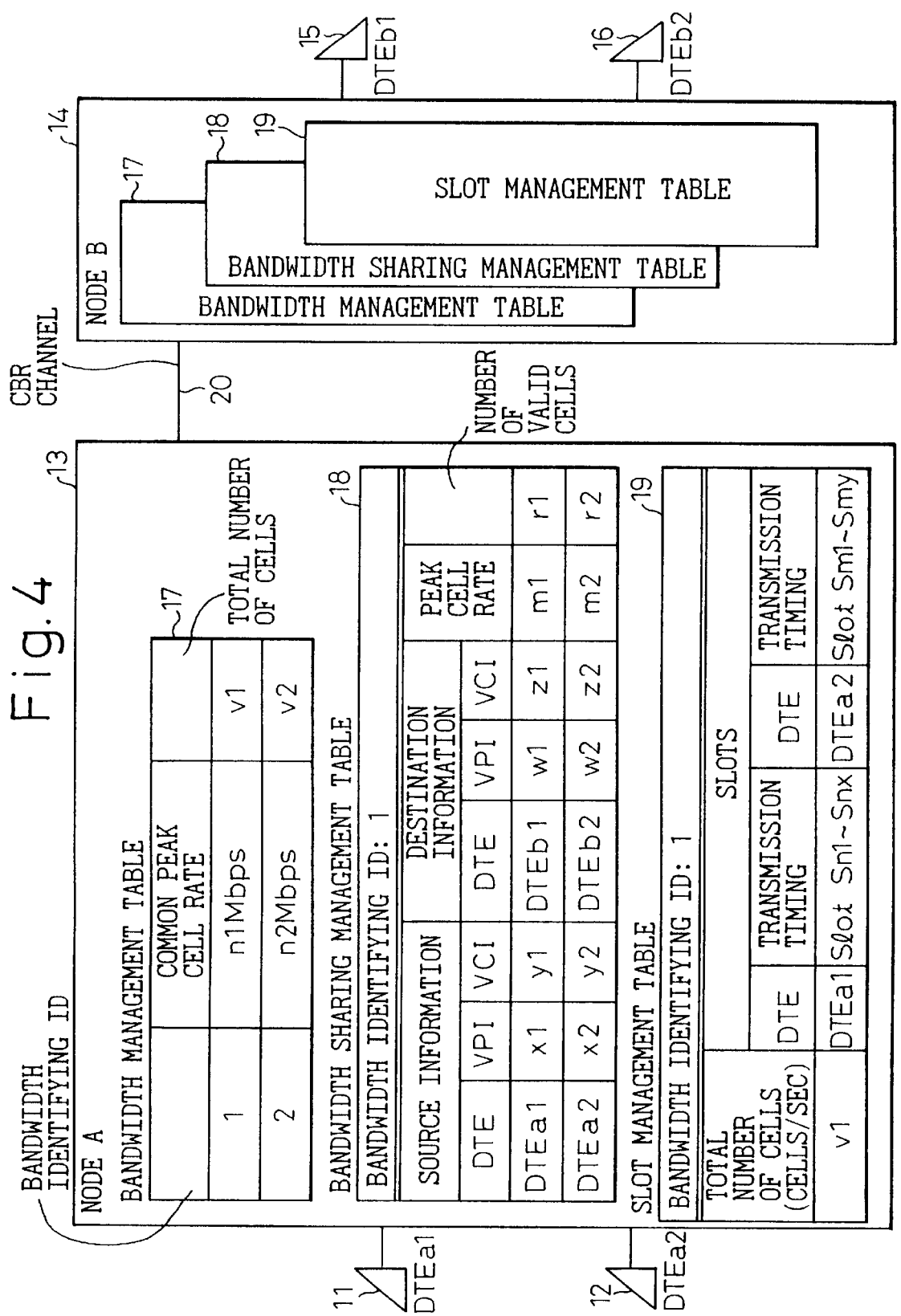
FIG. 4 is a diagram showing the basic configuration of a CBR bandwidth sharing apparatus used in an ATM exchange according to the present invention.

FIG. 4 is a diagram showing the basic configuration of a CBR bandwidth sharing apparatus used in an ATM exchange according to the present invention.

In FIG. 4, two terminals DTE a1 and DTE a2 (11 and 12) are accommodated in a node A (13), which is an ATM exchange. Likewise, two terminals DTE b1 and DTE b2 (15 and 16) are accommodated in a node B (14), which is also an ATM exchange. A CBR channel 20 is set up between the node 13 and the node 14.

Each node has a bandwidth management table 17 in which a bandwidth (common peak cell rate) to be shared by the terminals 11 and 12 or 15 and 16 accommodated in the node 13 or 14 and the total number of cells (the sum of valid cells and invalid cells) are registered for each preregistered or newly created bandwidth identifying ID.

When a terminal with a registered ID requests a connection to the network, the node 13 or 14 refers to the table 17 and reserves a bandwidth for use between the nodes 13 and 14 within the bandwidth (not greater than the bandwidth) registered for that ID. Generally, terminals with the same service category are assigned the same bandwidth identifying ID, but this requires satisfying the registration requirements in a bandwidth sharing management table 18 hereinafter described.

The bandwidth sharing management table 18 is used to register the source and destination terminals that share the bandwidth defined for each bandwidth identifying ID in the bandwidth management table 17, and to manage setting parameters for the registered terminals. The illustrated example shows the case of bandwidth identifying ID=1.

When registering the terminals in the table 18, it is determined whether the peak cell rate of each terminal is within the common peak cell rate registered in the bandwidth management table 17 (m1, m2≦n1 Mbps), and whether the sum of valid cells of all the terminals, including the already registered terminals, is within the total number of cells registered in the bandwidth management table 17 (r1+r2≦V1). The bandwidth identifying ID here is used to identify DTEs that use the same bandwidth within the node.

A slot management table 19 is used to allocate, for each bandwidth identifying ID in bandwidth management table 17, timing slots capable of transmitting the number of valid cells registered for each accommodated terminal in the bandwidth sharing management table 18, based on the total number of cells that can be transmitted per unit time.

In the illustrated example, at the node 13, of the total number of cells, V1, for the bandwidth identifying ID=1, the valid cells, r1, of the terminal 11 are allocated slot numbers Sn1 to Snx and the valid cells, r2, of the terminal 12 are allocated slot numbers Sm1 to Smy. Slots are also allocated in like manner to the respective terminals 14 and 16 at the node 14.

According to the illustrated example, by using the tables 17 to 19, the plurality of terminals 11 and 12 accommodated in the node 13 can transmit valid cells at the slot timings Sn1 to Snx and Sm1 to Smy within the respective maximum valid cell numbers r1 and r2 and within the same CBR bandwidth identified by the bandwidth identifying ID=1. The same also applies to the node 14.

Though not shown in FIG. 4, a means for performing processing for the bandwidth sharing of the present invention based on the contents of each of the above tables, and a communication means for transmitting the management tables in order to maintain agreement between the corresponding management tables at both nodes of the CBR communication, as will be described later, are also included in the basic configuration of the present invention.

FIGS. 5A to 5D are diagrams for explaining the operation of bandwidth sharing according to the present invention.

Figure 5A:
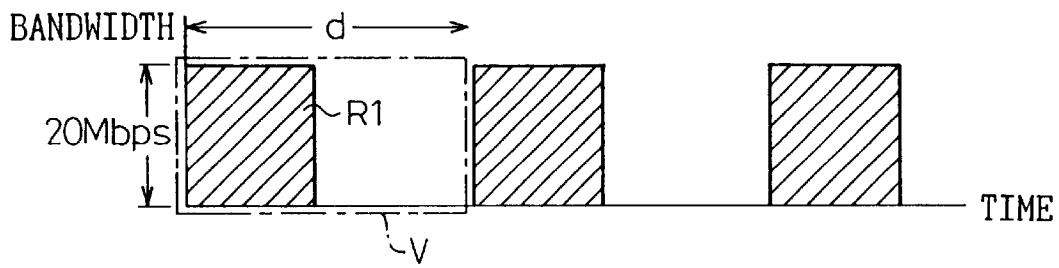
FIGS. 5A to 5D are diagrams for explaining the operation of bandwidth sharing according to the present invention.
Figure 5B:
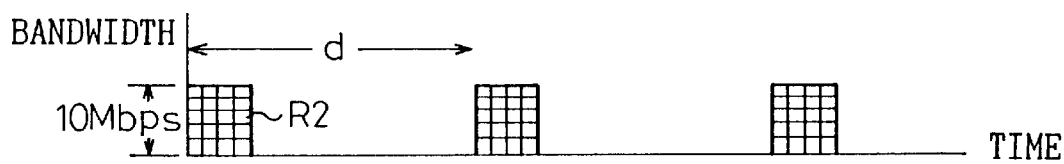

FIG. 5A shows that the peak cell rate of the terminal 11 in FIG. 4 is 20 Mbps, and that a valid cell (shaded portion R1) is transmitted in the first half period of the cell transmission cycle d resulting from information compression, etc. On the other hand, FIG. 5B shows that the peak cell rate of the terminal 12 in FIG. 4 is 10 Mbps, and that a valid cell (shaded portion R2) is transmitted in the first ¼ period of the same cell transmission cycle d.

According to the present invention, a new bandwidth identifying ID corresponding to the higher cell rate 20 Mbps is assigned to represent the common peak cell rate, and registered in the bandwidth management table 17. Or, the bandwidth identifying ID for the common peak cell rate 20 Mbps preregistered in the bandwidth management table 17 is selected. Further, the total number of cells, V, (enclosed within the semi-dashed lines in FIG. 5(A)) corresponding to that bandwidth identifying ID is registered.

Figure 5C:
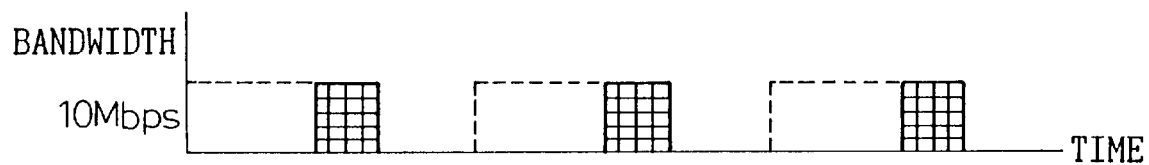
Figure 5D:
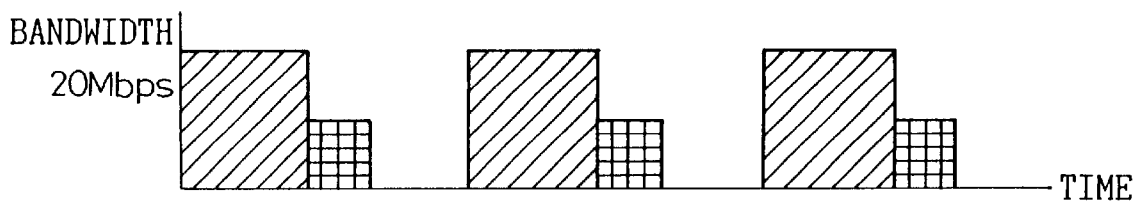

In the bandwidth sharing management table 18 having the bandwidth identifying ID, the terminals 11 and 12 that satisfy both the peak cell rate (≦20 Mbps) and the number of valid cells (R1+R2<V) are registered along with the terminals 15 and 16 at the opposite end of the communication system. FIG. 5C shows that in the slot management table 19 a transmission timing is allocated so as to place the valid cell R2 immediately following the valid cell R1. Thus, the sharing of the 20-Mbps CBR bandwidth is achieved, as shown in FIG. 5D.

Next, an embodiment of the present invention will be described with reference to FIG. 6A and subsequent drawings.

Figure 6A:
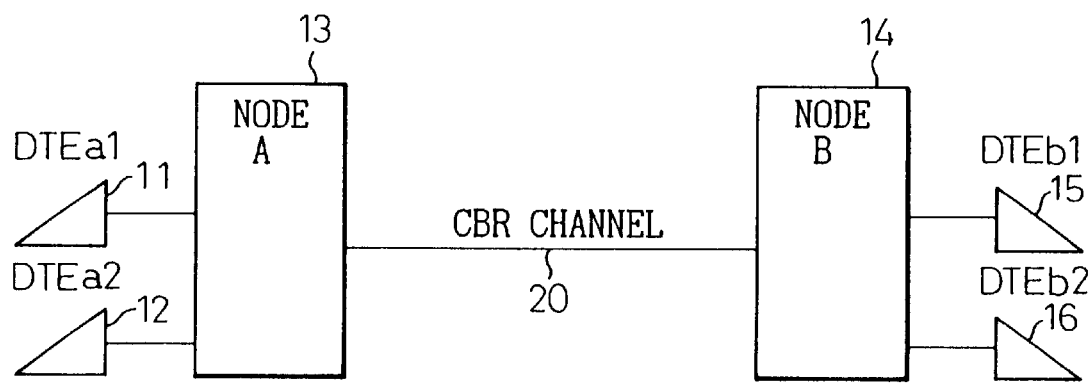
FIGS. 6A and 6B are diagrams showing examples of the network configuration carrying out the present invention.
Figure 6B:
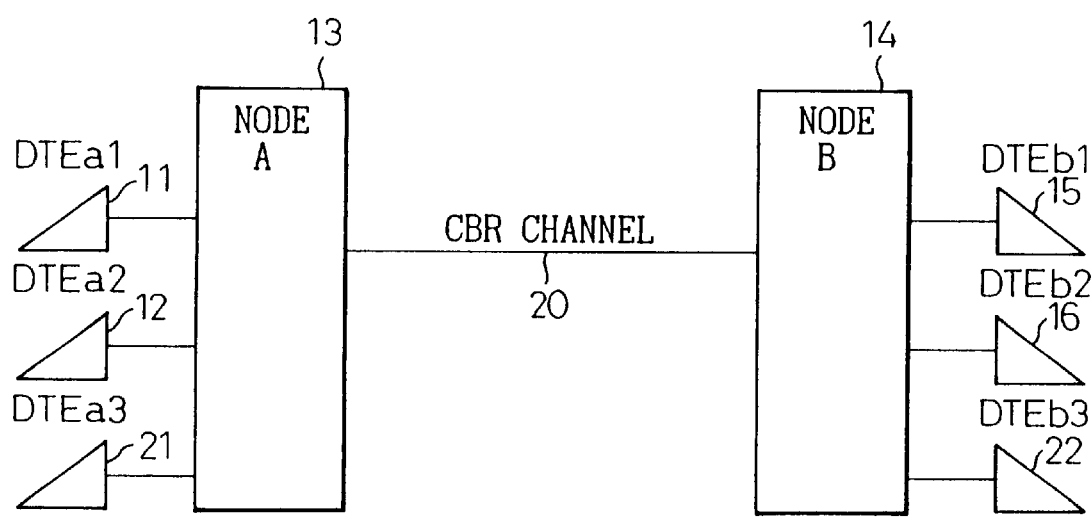

FIGS. 6A and 6B show examples of the network configuration carrying out the present invention: FIG. 6A shows the same example as that of FIG. 4A, and FIG. 6B an example in which terminals (DTE a3 and DTE b3) are added.

Figure 7A:
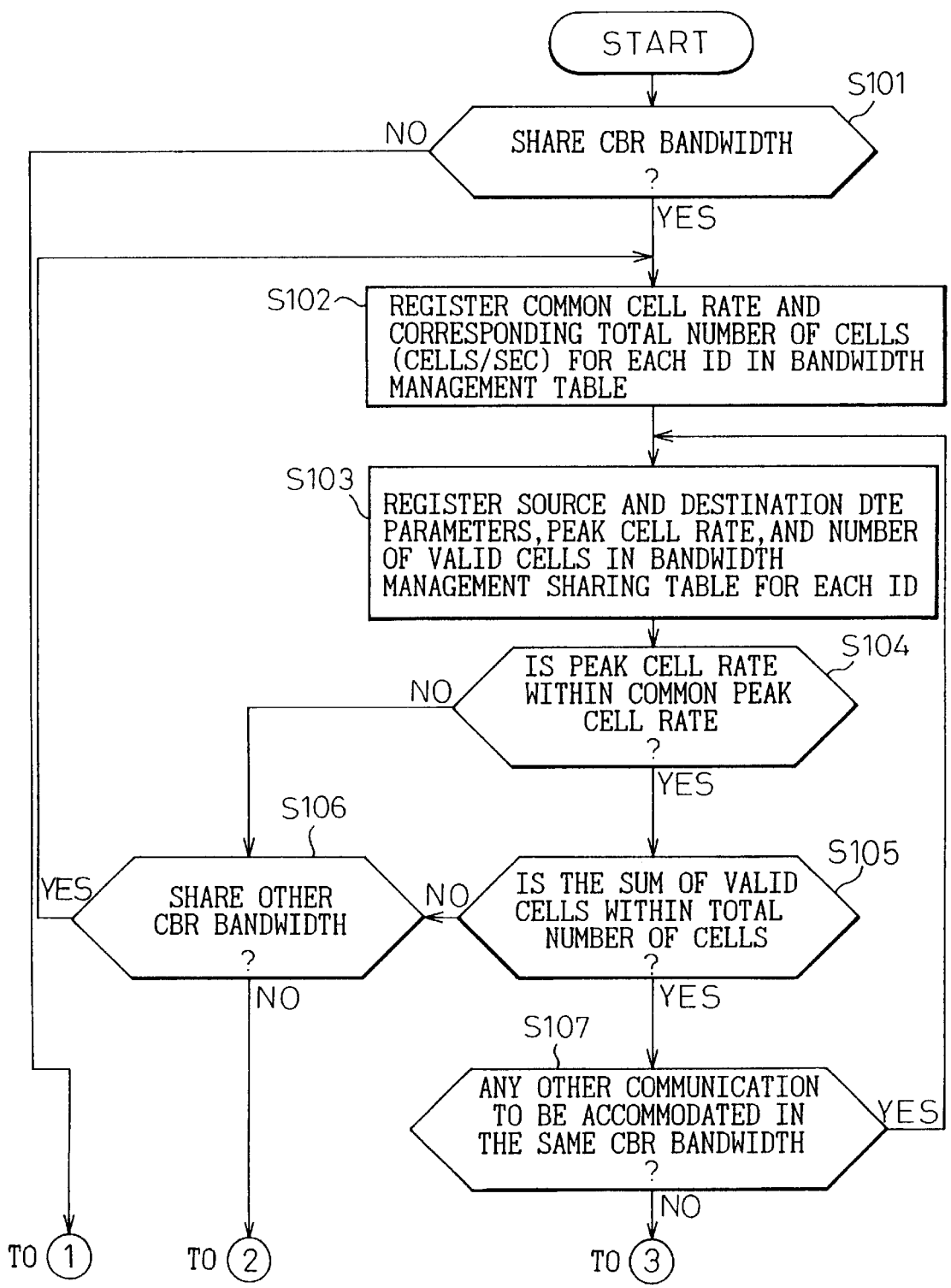
FIGS. 7A and 7B are diagrams showing an example of a registration process flow for management tables according to the present invention.
Figure 7B:
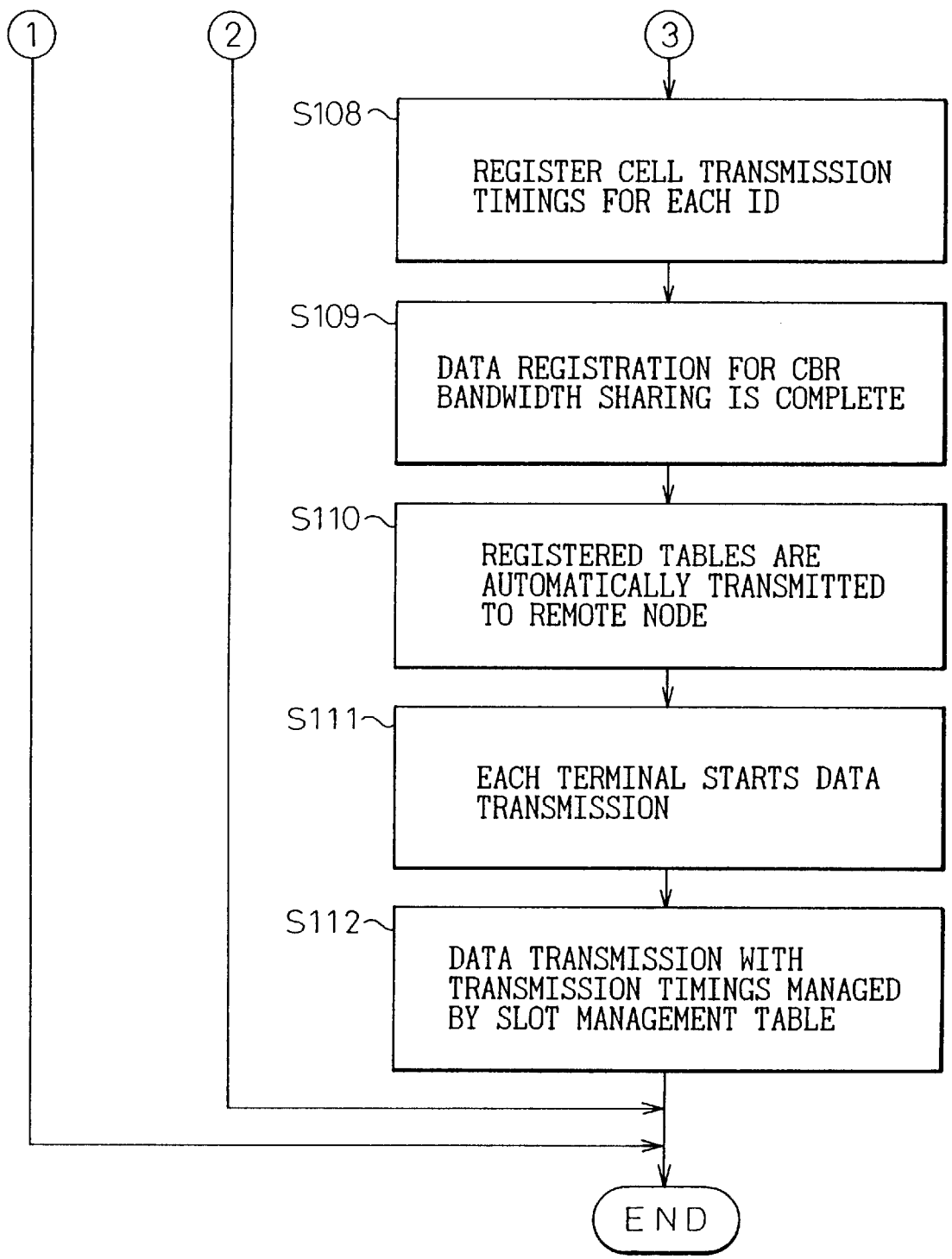

FIGS. 7A and 7B show an example of a registration process flow for the respective management tables according to the present invention.

Figure 9:
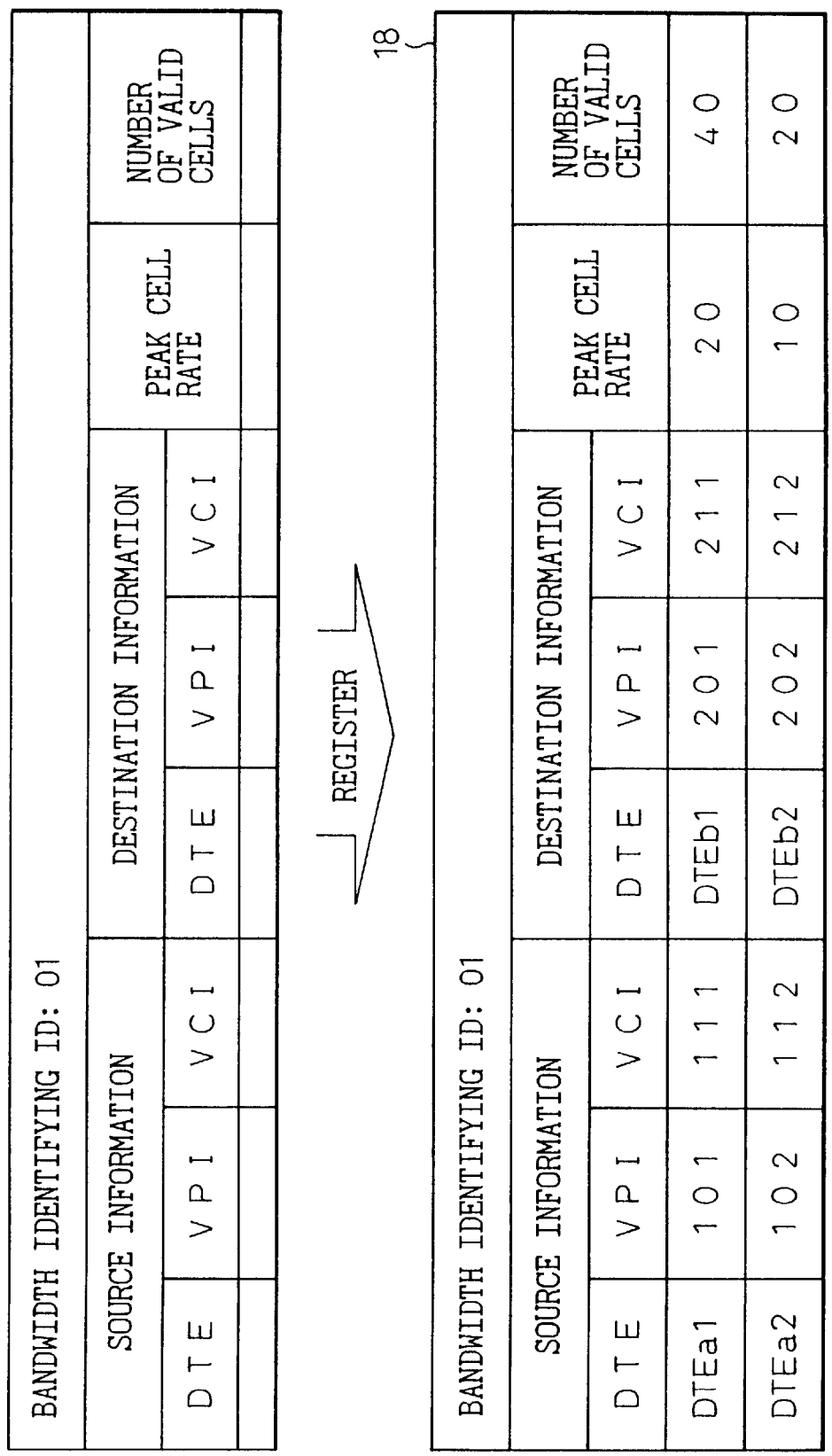
FIG. 9 is a diagram showing a registration example of a bandwidth sharing management table.

FIGS. 8 to 10 show registration examples of the bandwidth management table, bandwidth sharing management table, and slot management table, respectively.

Figure 11A:
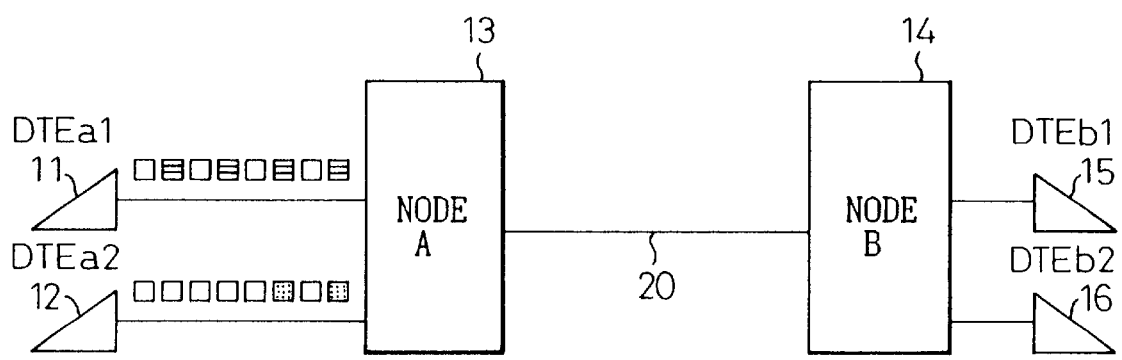
FIGS. 11A and 11B are diagrams showing one example of CBR communication operation according to the present invention.
Figure 11B:
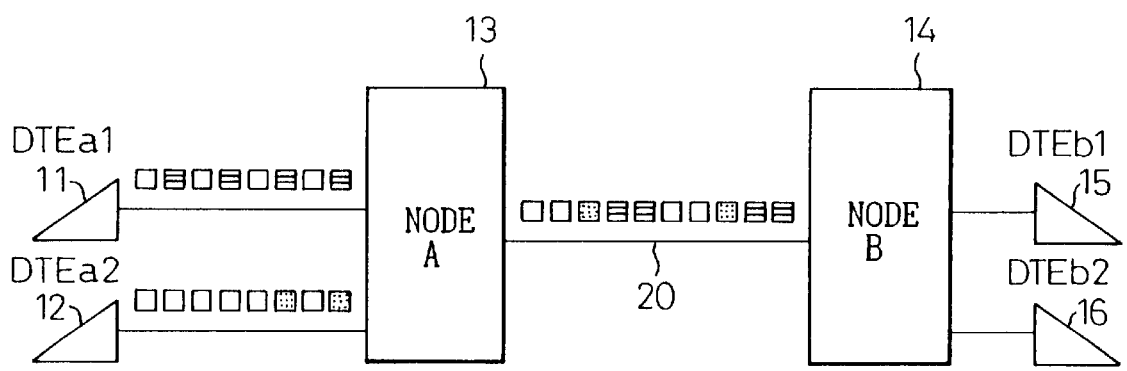

FIGS. 11A and 11B schematically show one example of CBR communication operation according to the present invention.

The following description deals with the processing at the node 13, but it will be recognized that the processing at the node 14 is fundamentally the same.

In FIGS. 7A and 7B, the node 13 performs setup registration processing of the respective management tables when setting up the system. First, it is determined whether the CBR bandwidth sharing of the present invention is to be performed or not (S101); if the CBR bandwidth is not to be shared, the setup registration process is terminated. On the other hand, if the CBR bandwidth is to be shared, the common cell rate and the total number of cells (cells/sec) are registered for each bandwidth identifying ID in the bandwidth management table 17.

FIG. 8 shows a registration example of the bandwidth management table 17 when the peak cell rates of the terminals 11 (DTE a1) and 12 (DTE a2) are 20 Mbps and 10 Mbps, respectively. In this example, "01" is assigned as the bandwidth identifying ID, and the higher peak cell rate 20 Mbps is set as the common peak cell rate and 100 as the total number of cells.

Here, to register in the bandwidth management table 17, necessary conditions may be set each time the registration is performed, or a bandwidth identifying ID table consisting of predetermined combinations of common cell rates and the total number of cells may be created in advance, and the appropriate combination may be selected from the table.

Next, for each bandwidth identifying ID registered in the bandwidth management table 17, the source and destination terminal parameters necessary when performing CBR communication, the peak cell rate for the CBR communication, and the number of valid cells are registered in the bandwidth sharing management table 18 (S103). The values of virtual path identifiers (VPIs) and virtual channel identifies (VCIs) as terminal address information are set as the terminal parameters, as shown in FIG. 9.

For the peak cell rate and the number of valid cells, the requirements defined in the following steps 104 to 107 must be satisfied. The requirements described here are based on the assumption that the peak cell rate and the number of valid cells between the terminals 11 and 15 are "20 (Mbps)" and "40 (cells/sec)", respectively, and the peak cell rate and the number of valid cells between the terminals 12 and 16 are "10 (Mbps)" and "20 (cells/sec)", respectively.

In step S104, it is determined whether the peak cell rate requirement is satisfied. That is, if the peak cell rate value is larger than the common peak cell rate value 20 (Mbps) registered in FIG. 8, then it is determined that the CBR communication is not possible with this bandwidth identifying ID "01", and the process proceeds to step S106 where a decision is made as to whether the bandwidth should be shared with another bandwidth identifying ID. If the bandwidth is to be shared, the process returns to step S102 to repeat the registration processing of the bandwidth management table 17 with another bandwidth identifying ID. If the bandwidth is not to be shared, the CBR bandwidth sharing process of the present invention is terminated.

In the illustrated example, the peak cell rates are "20" and "10" and the common peak cell rate is "20" at maximum, as shown in FIG. 9; therefore, the process proceeds to step S105 to determine whether the sum of the valid cells (40+20=60 (cells/sec)) registered for the bandwidth identifying ID "01" in the bandwidth sharing management table 18 is within the total number of cells (100 (cells/sec)) in FIG. 8.

If the sum of the valid cells is larger than the total number of cells, in this case also it is determined that the CBR communication is not possible with the bandwidth identifying ID "01", and the process proceeds to step S106 where a decision is made as to whether the bandwidth should be shared with another bandwidth identifying ID. If the bandwidth is to be shared, the process returns to step S102 to repeat the registration processing of the bandwidth management table 17 with another bandwidth identifying ID. If the bandwidth is not to be shared, the CBR bandwidth sharing process of the present invention is terminated.

In the illustrated example, the sum of the valid cells is smaller than the total number of cells (60<100); therefore, to achieve more efficient CBR communication, it is determined whether there is any other communication that can be accommodated in the CBR bandwidth of the bandwidth identifying ID "01" (S107). If there is such communication, the process returns to step S103 to repeat the registration processing of the bandwidth sharing management table 18. If there is no such communication, the processing for the bandwidth sharing management table 18 is terminated.

As the final registration processing, the registration processing of the slot management table 19 is performed (S108). In this step, cell transmission timings for transmitting cells from the transmitting terminals onto the CBR channel are registered for each bandwidth identifying ID. In the example of FIG. 10, transmission timings "01 to 40" and "41 to 60" are allocated to the respective terminals 11 and 12 accommodated in the node 13.

The data setup registration for the CBR bandwidth sharing of the present invention is now complete (S109). Next, in step S110, the registered contents (including changed contents) of each table are transmitted to the node 14 at the remote end of the CBR communication. In this way, the contents of the management tables are maintained identical between the nodes. The processing in this step will be described later.

After that, data transmissions from the terminals 11 and 12 are started as shown, for example, in FIGS. 11A and 11B, and the node 13 that received the data transmits the received data to the remote node 14 in accordance with the timings registered in the slot management table 19 (S111 and 112).

FIGS. 12 to 16 illustrate an example of how the registered contents of the tables are transmitted to the node 14 at the remote end of the CBR communication in the above-mentioned step S110.

FIG. 12 is a diagram for explaining the transmission of each registered management table to the remote node.

Figure 13C:
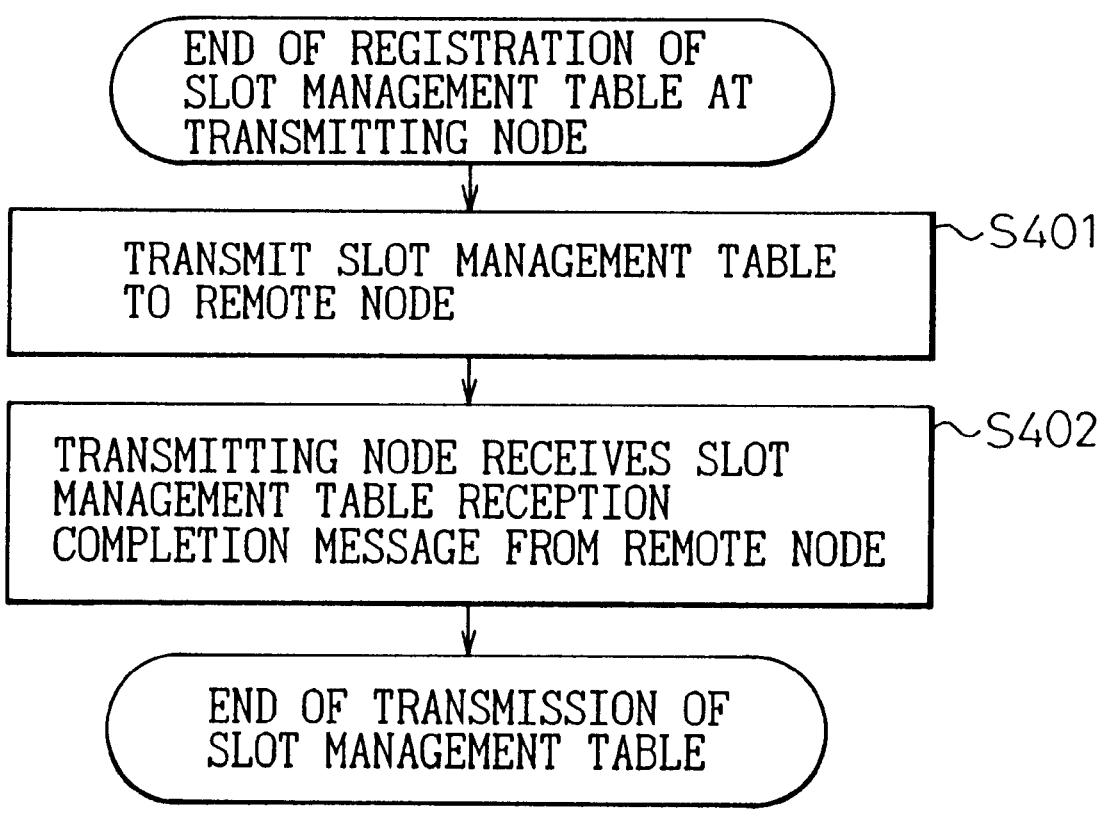

FIGS. 13A to 13C show examples of transmission process flows for the newly registered management tables, performed in the above step S110.

Figure 14:
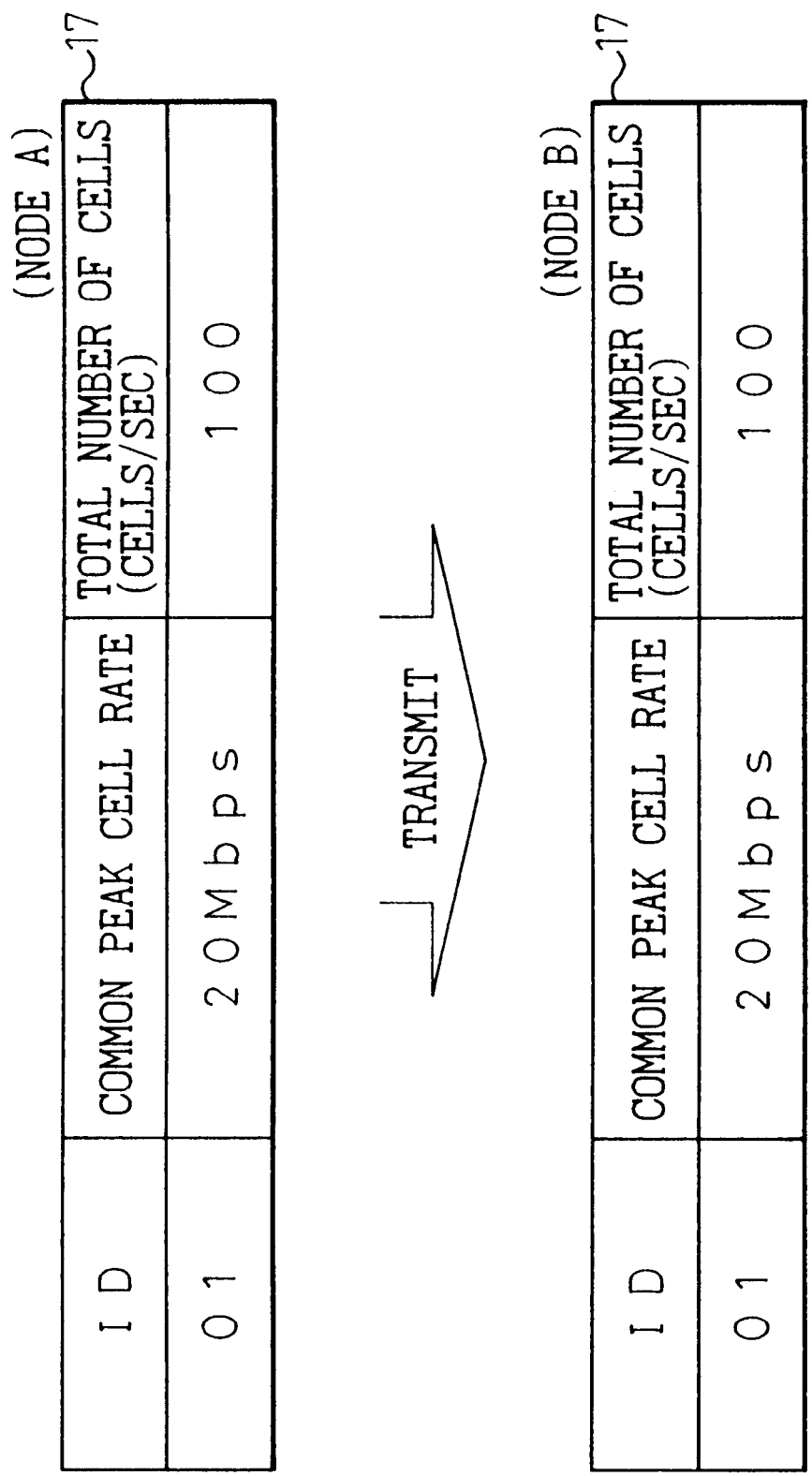
FIG. 14 is a diagram showing an example of transmission of the bandwidth management table.
Figure 16:
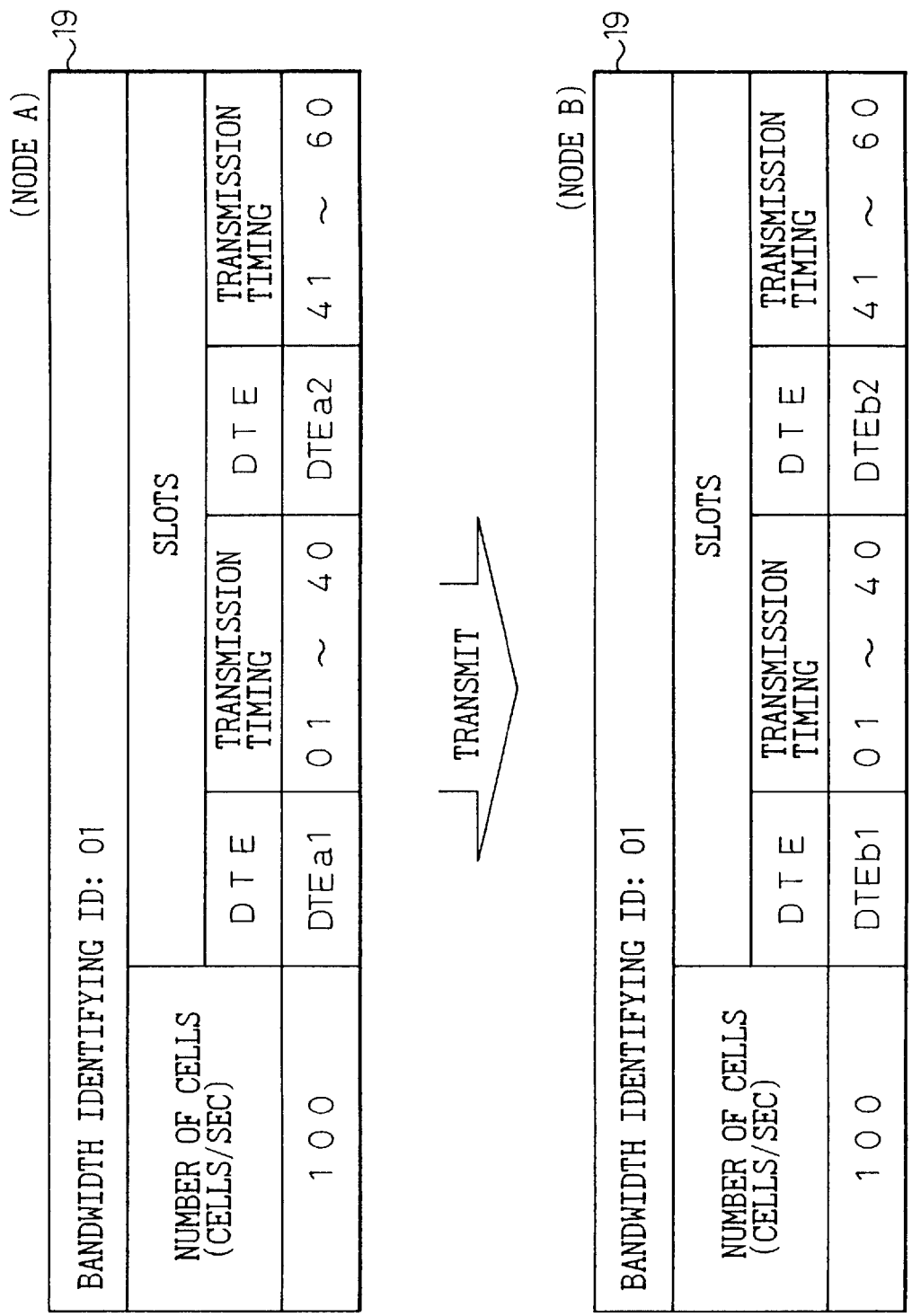
FIG. 16 is a diagram showing an example of transmission of the slot management table.

FIGS. 14 to 16 show examples of the transmission of the bandwidth management table, bandwidth sharing management table, and slot management table, respectively.

The contents of the management tables 17 to 19, newly registered or changed, are transmitted to the remote node 14. FIGS. 13A to 13C each illustrate the case of registered contents transmission. The registered contents of the management tables 17 to 19, upon completion of the registration processing at the transmitting node, are transmitted to the remote node (S201, 301, and 401). When a reception completion notification is received from the remote node, the table transmission process is terminated (S202, 302, and 402).

As shown in FIG. 14, the bandwidth identifying ID and its associated information newly registered in the bandwidth management table 17 are transferred unchanged for registration in the remote node. In this case, the bandwidth sharing management table 18 and slot management table 19 corresponding to the newly registered bandwidth ID are also transferred and registered basically unchanged, except that the registered contents (DTE, VPI/VCI) of the source information and destination information are interchanged, as shown in FIG. 15, because the source/destination relationship is reversed at the remote node. Further, in the slot management table 19 at the remote node, the terminals (DTE b1, DTE b2) accommodated in the same node are mapped to the terminal parameters (DTES) corresponding to the received transmission timings, as shown in FIG. 16.

FIGS. 17A to 19 illustrate an example of how the changed contents of the management tables are reported to the remote node in the earlier described step S110 when an additional terminal is accommodated at each node for the bandwidth sharing of the present invention, as shown in FIG. 6B. When assigning a new bandwidth identifying ID to the newly accommodated terminals (DTE a3, DTE b3), processes similar to those shown in FIGS. 12 to 16 are performed. The following, however, describes an example in which the new terminals are additionally accommodated in the common bandwidth having the existing bandwidth identifying ID "01" (see step S107 in FIG. 7A).

FIGS. 17A and 17B show examples of transmission process flows of the changed management tables, performed in the earlier described step Silo.

Figure 18:
FIG. 18 is a diagram showing an example of changes made to the bandwidth sharing management table.

FIGS. 18 and 19 show examples of changes made to the bandwidth sharing management table and slot management table, respectively.

In FIGS. 17A and 17B, as in the case of FIGS. 13A to 13C, the changed management tables are transmitted to the remote node (S501 and 601), and when a reception completion notification is received from the remote node, the table transmission process is terminated (S502 and 602). In this example, however, the bandwidth management table where no changes are made is not transmitted.

In FIG. 18, information relating to the added terminals, enclosed by thick solid lines, is added to the bandwidth sharing management table 18. In FIG. 19 also, information relating to the added terminals, enclosed by thick solid lines, is added to the slot management table 19. Here, 61 to 70 are assigned as the transmission timings.

As described above, according to the present invention, when performing CBR communication over an ATM network, an invalid-cell transmission period within one CBR channel bandwidth is used to provide a valid-cell transmission bandwidth within the same CBR bandwidth, thereby enabling the bandwidth of one CBR channel to be shared and used as a plurality of CBR channels.

The present invention is particularly effective for CBR transmission of signals that are output in a bursty manner, such as buffered signals or compressed signals, and can realize a plurality of CBR communication connections on one CBR channel by utilizing signal non-transmission periods between the bursts.

What is claimed is:

1. A transmission bandwidth sharing apparatus accommodating a plurality of terminals, said apparatus comprising:
    a constant bit rate circuit;
    means for registering said terminals meeting the requirement that each maximum transmission bit rate of the registered terminals is equal to or lower than the maximum transmission bit rate of said constant bit rate circuit, and the sum of data transmission capacities of valid signals from the registered terminals is equal to or smaller than the data transmission capacity of the constant bit rate circuit at a predetermined cycle; and
    means for allocating a timing in an invalid signal transmission period of one of said registered terminals for use as a transmission timing of valid signals from the other registered terminals, to provide a fixed valid signal transmission period to each of the registered terminals at said predetermined cycle and thereby to allow said constant bit rate circuit to be shared among the registered terminals and periodical burst data provided by each of said terminals are transmitted through said constant bit rate circuit bandwidth that is determined to guarantee the maximum transmission rate among transmission rates of said burst data.

2. A transmission bandwidth sharing apparatus comprising:
    a bandwidth management table for registering a bandwidth and information relating to said bandwidth for a constant bit rate transmission channel;
    a bandwidth sharing management table for registering, for said constant bit rate transmission channel, one or more terminals that meet the requirement that each maximum transmission bit rate of the registered terminals is equal to or lower than the maximum transmission bit rate of said constant bit rate transmission channel, and the sum of data transmission capacities of valid signals from the registered terminals is equal to or smaller than the data transmission capacity of the constant bit rate transmission channel during a predetermined cycle;
    a signal transmission timing management table for registering valid signal transmission timings of said registered terminals; and
    transmission channel sharing means for allocating a timing in an invalid signal transmission period of one of said registered terminals for use as a transmission timing of a valid signal from the other registered terminals, to provide a fixed valid signal transmission period to each of the registered terminals within said predetermined cycle and thereby enabling said constant bit rate transmission channel to be shared among the registered terminals and periodical burst data provided by each of said terminals are transmitted through said constant bit rate transmission channel bandwidth that is determined to guarantee the maximum transmission rate among transmission rates of said burst data.

3. An apparatus according to claim 2, wherein said transmission bandwidth sharing apparatus and said terminals are ATM devices.

4. A transmission bandwidth sharing apparatus comprising:
    a bandwidth management table for registering a bandwidth and information relating to said bandwidth for a constant bit rate transmission channel;
    a bandwidth sharing management table for registering, for said constant bit rate transmission channel, one or more terminals that meet the requirement that each maximum transmission bit rate of the registered terminals is equal to or lower than the maximum transmission bit rate of said constant bit rate transmission channel, and the sum of data transmission capacities of valid signals from the registered terminals is equal to or smaller than the data transmission capacity of the constant bit rate transmission channel during a predetermined cycle;
    a signal transmission timing management table for registering valid signal transmission timings of said registered terminals;
    transmission channel sharing means for allocating a timing in an invalid signal transmission period of one of said registered terminals for use as a transmission timing of a valid signal from the other registered terminals, to provide a fixed valid signal transmission period to each of the registered terminals within said predetermined cycle and thereby enabling said constant bit rate transmission channel to be shared among the registered terminals; and
    transmission means for transmitting all or part of said bandwidth management table, bandwidth sharing management table, and signal transmission timing management table to another transmission bandwidth sharing apparatus at a remote end of said communication.

5. A transmission bandwidth sharing apparatus comprising:
    a bandwidth management table for registering a bandwidth and information relating to said bandwidth for a constant bit rate transmission channel;
    a bandwidth sharing management table for registering, for said constant bit rate transmission channel, one or more terminals that meet the requirement that each maximum transmission bit rate of the registered terminals is equal to or lower than the maximum transmission bit rate of said constant bit rate transmission channel, and the sum of data transmission capacities of valid signals from the registered terminals is equal to or smaller than the data transmission capacity of the constant bit rate transmission channel during a predetermined cycle;
    a signal transmission timing management table for registering valid signal transmission timings of said registered terminals; and
    transmission channel sharing means for allocating a timing in an invalid signal transmission period of one of said registered terminals for use as a transmission timing of a valid signal from the other registered terminals, to provide a fixed valid signal transmission period to each of the registered terminals within said predetermined cycle and thereby enabling said constant bit rate transmission channel to be shared among the registered terminals, and
    periodical burst data provided by each of said terminals are transmitted through said one constant bit rate bandwidth that is determined to guarantee the maximum transmission rate among transmission rates of said burst data wherein said transmission sharing means sets up only one communication connection within one constant bit rate transmission channel when the sharing of said constant bit rate transmission channel is not specified.

6. A transmission bandwidth sharing apparatus comprising:
- a bandwidth management table for registering a bandwidth and information relating to said bandwidth for a constant bit rate transmission channel;
- a bandwidth sharing management table for registering, for said constant bit rate transmission channel, one or more terminals that meet the requirement that each maximum transmission bit rate of the registered terminals is equal to or lower than the maximum transmission bit rate of said constant bit rate transmission channel, and the sum of data transmission capacities of valid signals from the registered terminals is equal to or smaller than the data transmission capacity of the constant bit rate transmission channel during a predetermined cycle;
- a signal transmission timing management table for registering valid signal transmission timings of said registered terminals; and
- transmission channel sharing means for allocating a timing in an invalid signal transmission period of one of said registered terminals for use as a transmission timing of a valid signal from the other registered terminals, to provide a fixed valid signal transmission period to each of the registered terminals within said predetermined cycle and thereby enabling said constant bit rate transmission channel to be shared among the registered terminals,
- wherein said transmission bandwidth sharing apparatus and said terminals are ATM devices, and wherein said bandwidth information includes bandwidth identifying information, a peak cell rate to be shared by said terminals, and the total number of valid and invalid cells contained therein, and said terminal information includes the peak cell rate of each of said terminals and the number of valid cells contained therein.

7. A transmission bandwidth sharing apparatus comprising:
- a bandwidth management table for registering a bandwidth and information relating to said bandwidth for a constant bit rate transmission channel;
- a bandwidth sharing management table for registering, for said constant bit rate transmission channel, one or more terminals that meet the requirement that each maximum transmission bit rate of the registered terminals is equal to or lower than the maximum transmission bit rate of said constant bit rate transmission channel, and the sum of data transmission capacities of valid signals from the registered terminals is equal to or smaller than the data transmission capacity of the constant bit rate transmission channel during a predetermined cycle;
- a signal transmission timing management table for registering valid signal transmission timings of said registered terminals; and
- transmission channel sharing means for allocating a timing in an invalid signal transmission period of one of said registered terminals for use as a transmission timing of a valid signal from the other registered terminals, to provide a fixed valid signal transmission period to each of the registered terminals within said predetermined cycle and thereby enabling said constant bit rate transmission channel to be shared among the registered terminals,
- wherein said transmission bandwidth sharing apparatus and said terminals are ATM devices, and wherein said bandwidth information includes bandwidth identifying information, a peak cell rate to be shared by said terminals, and the total number of valid and invalid cells contained therein, said terminal information includes the peak cell rate of each of said terminals and the number of valid cells contained therein, and said transmission sharing means allocates timings in invalid cell signal transmission periods to terminals when the sum of the peak cell rates of said terminals is within the peak cell rate to be shared by said terminals is within the total number of cells contained in the peak cell rate to be shared by said terminals.

8. A transmission bandwidth sharing method, comprising the steps of:
- registering identified each constant bit rate bandwidth;
- registering, for said each constant bit rate bandwidth, one or more terminals that commonly use one constant bit rate bandwidth and meet the requirement that each maximum transmission bit rate of the registered terminals is equal to or lower than the maximum transmission bit rate of the one constant bit rate bandwidth, and the sum of data transmission capacities of valid signals from the registered terminals is equal to or smaller than the data transmission capacity of the one constant bit rate bandwidth at a predetermined cycle;
- allocating, for said one constant bit rate bandwidth, a timing in an invalid signal transmission period of one of the registered terminals for use as a transmission timing of a valid signal from the other registered terminals, to provide a fixed valid signal transmission period to the each registered terminal at said predetermined cycle; and
- allowing said registered terminals to transmit a valid signal for said fixed valid signal transmission period at said predetermined cycle, to establish a plurality of communication connections within said one constant bit rate bandwidth thereby periodical burst data provided by each of said terminals are transmitted through said one constant bit rate bandwidth that is determined to guarantee the maximum transmission rate among transmission rates of said burst data.

9. A method according to claim 8, further comprising transmitting all or part of registration information obtained by said registration to another apparatus at a remote end of said communication in order to share transmission channel information.

10. A method according to claim 9, further comprising making said other apparatus change said transmission channel information upon receipt to information that matches said other apparatus.

11. A transmission bandwidth sharing method, comprising the steps of:
- registering identified each constant bit rate bandwidth;
- registering, for said each constant bit rate bandwidth, one or more terminals that commonly use one constant bit rate bandwidth and meet the requirement that each maximum transmission bit rate of the registered terminals is equal to or lower than the maximum transmission bit rate of the one constant bit rate bandwidth, and the sum of data transmission capacities of valid signals from the registered terminals is equal to or smaller than the data transmission capacity of the one constant bit rate bandwidth at a predetermined cycle;
- allocating, for said one constant bit rate bandwidth, a timing in an invalid signal transmission period of one of the registered terminals for use as a transmission timing of a valid signal from the other registered terminals, to provide a fixed valid signal transmission period to the each registered terminal at said predetermined cycle; and allowing said registered terminals to transmit a valid signal for said fixed valid signal transmission period at said predetermined cycle, to establish a plurality of communication connections within said one constant bit rate bandwidth, further comprising setting up only one communication connection within said one constant bit rate bandwidth when the sharing of said constant bit rate bandwidth is not specified, wherein periodical burst data provided by each of said terminals are transmitted through said one constant bit rate bandwidth that is determined to guarantee the maximum transmission rate among transmission rates of said burst data.

\* \* \* \* \*